United States Patent Office 3,634,385
Patented Jan. 11, 1972

3,634,385
METHOD OF DEAGGLOMERATING POLYMER PARTICLES
Wilhelm E. Walles, Midland, Mich., and James J. Davies, Baton Rouge, La., assignors to The Dow Chemical Company, Midland, Mich.
No Drawing. Filed May 16, 1969, Ser. No. 825,391
Int. Cl. C08f 29/04, 29/06, 29/18
U.S. Cl. 260—94.9 GD
8 Claims

ABSTRACT OF THE DISCLOSURE

Agglomerates of polymer particles in a polymer powder are broken up to increase the density, the surface area, and the fluidity of the polymer powder by charging the polymer powder to a deagglomeration zone, charging a silicon-containing compound to the deagglomeration zone, charging a liquid such as cyclohexane to the deagglomeration zone, and imparting motion to the deagglomeration zone such as by rotation about a horizontal axis to break up the agglomerates of polymer particles. This treatment increases the bulk density of the polymer powder by a factor of about 3, the surface area by a factor of about 14, and the fluidity by a factor of about 14. This treatment of the polymer powder broadens the utility of the polymer such as by rendering it more amenable to powder molding and the like.

---

This invention relates to the art of polymer powders. In one aspect, this invention relates to methods for treating polymer powders to increase density, fluidity, and surface area of the powders. In another aspect, this invention relates to methods for breaking up agglomerates of polymer particles in a polymer powder.

This business of fabricating polymer raw materials into useful articles of manufacture has increased so tremendously in recent years that plastic has replaced many other types of construction materials. Since the utility of polymer raw materials is often limited by the form in which the polymer is available, the polymer industry continually seeks methods for producing and/or treating polymer raw materials such that they can be offered to customers in many different forms.

The demand for polymer powders which are substantially free of clusters or agglomerates of individual polymer particles has increased greatly in recent years because of the widespread market which has developed for this type of polymer raw material. In powder molding, for example, by the so-called Engel process to produce containers, waste receptacles, tanks, boat hulls, and the like, it is desirable for the polymer powder to have a minimum of polymer particle clusters in order to produce an acceptable product. While it has been suggested to mechanically grind the polymer powder to break up these clusters, the grinding operation is ineffective because the powder will agglomerate after grinding and because it often fractures the individual polymer particles and makes them rough thereby actually decreasing the fluidity of the powder in some cases. Moreover, the grinding operation is quite expensive in that it requires the use of precision, large scale grinding equipment in order to operate on a commercial scale.

According to this invention, the density, fluidity, and surface area of a polymer powder are increased by breaking up agglomerates or clusters of polymer particles present in the polymer powder by the steps which comprise charging the polymer powder to a deagglomeration zone, charging to the deagglomeration zone finely divided silicon dioxide particles and a liquid which is substantially inert to the silicon dioxide and which is incapable of acting as a solvent for the polymer, and imparting motion to the materials in the deagglomeration zone to break up the agglomerates of polymer particles. In a modification of the invention, a silicone compound such as, for example, hexamethyldisilazane is also employed in the deagglomeration zone along with the silicon dioxide to assist in breaking up the agglomerates. In yet another modification of the invention, grinding stones of generally spherical configuration can be used in the deagglomeration zone to assist in breaking up the agglomerates when motion is imparted to the ingredients.

Accordingly, it is an object of this invention to increase the density, the surface area, and the fluidity of a polymer powder.

Another object of this invention is to provide a method of breaking up agglomerates of polymer particles in a polymer powder.

A further object of this invention is to provide a method of treating a polymer powder to expand the utility of the powder.

These and other objects of the invention will become apparent to one skilled in the art after studying the following detailed description and the appended claims.

In practicing the method of this invention, agglomerates or clusters of polymer particles in a polymer powder are broken up into their individual particles by imparting motion to the polymer powder in a deagglomeration zone containing finely divided silicon dioxide and a liquid which is substantially inert to the silicon dioxide and which is characterized by being incapable of acting as a solvent for the polymer powder. When the agglomerates or clusters of polymer particles have been broken up by this technique, the density, the surface area, and the fluidity of the polymer powder are increased. The resulting polymer particles in the form of a powder substantially free of agglomerates or clusters is then recovered from the deagglomeration zone by any suitable and convenient technique. The resulting polymer powder can be used in a variety of different ways by many different techniques such as in the powder molding industry to produce shipping containers, waste and storage receptacles, industrial storage tanks, boat hulls, and the like. The resulting polymer powder is also particularly suitable for fluidized bed coating because of the uniformity of the individual particles.

While the method of this invention can be employed to break up agglomerates of polymer particles in substantially all types of polymer powders regardless of how the agglomerates or clusters may have been formed, the invention is particularly beneficial in treating polymers which by their very nature tend to contain clusters or agglomerates of polymer particles. Thus, polymers produced by the Ziegler slurry process or by emulsion polymerization processes are particularly amenable to treatment according to this invention because polymer powders of this type tend to possess clusters of individual polymer particles.

In practicing the method of this invention, the deagglomeration zone can include any suitable means for producing intimate mixing of the polymer powder, the silicon dioxide, and the inert liquid. Thus, the deagglomeration zone can be in the form of a vessel equipped with a suitable prime mover to impart rotation to the receptacle about a horizontal axis. The deagglomeration zone can also be in the form of a vessel equipped with suitable stirring means for thoroughly mixing the ingredients. It is thus evident that the invention is not to be bound or predicated upon any particular apparatus, and that any suitable means for imparting motion to the deagglomeration zone can be employed without departing from the spirit and scope of the invention.

The silicon dioxide is employed in any suitable and effective amount such as at least about 0.001 weight percent and preferably between about 0.001 and about 5 weight percent based upon the weight of the polymer in the deagglomeration zone. The silicon dioxide can be charged separately to the deagglomeration zone or it can be charged with the polymer powder if desired.

In a modification of the invention, at least about 0.001 weight percent and preferably between about 0.001 and about 5 weight percent silicone compound can be employed in the deagglomeration zone along with the silicon dioxide to assist in breaking up agglomerates of the polymer particles. Silicone compounds which can be used for this purpose are represented by the formulas (I)            $(R)_3SiNHSi(R)_3$ wherein each R can be the same or different and is selected from the group consisting of ethyl and methyl;

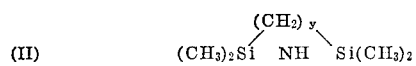

(II)            $(CH_3)_2Si\ NH\ Si(CH_3)_2$ with $(CH_2)_y$ bridge wherein y is an integer between 1 and 5, inclusive; and (III)           $CH_3OSi(CH_3)_3$ Exemplary silicone compounds which are within the scope of the above formulas and which can be used in the practice of the invention include hexamethyldisilazane;
hexaethyldisilazane;
1,1,1-trimethyl-3,3,3-triethyldisilazane;
1,3-dimethyl-1,1,3,3-tetraethyldisilazane;
1,3-diethyl-1,1,3,3-tetramethyldisilazane;
1-methyl-1,1,3,3,3-pentaethyldisilazane;
1-ethyl-1,1,3,3,3-pentamethyldisilazane;
2,2,4,4-tetramethyl 1-aza-2,4-disilacyclobutane;
2,2,5,5-tetramethyl 1-aza-2,5-disilacyclopentane;
2,2,6,6-tetramethyl 1-aza-2,6-disilacyclohexane;
2,2,7,7-tetramethyl 1-aza-2,7-disilacycloheptane;
2,2,8,8-tetramethyl 1-aza-2,8-disilacyclooctane; and
methoxy(trimethyl)silane.

While the invention is not to be bound by or predicated upon any particular theory, it is believed that the silicon dioxide particles form a microthin coating around the individual polymer particles as they become separated from the agglomerates under the influence of the motion imparted to the deagglomeration zone. This result coupled with the reduction in the Van der Waal's forces between the polymer particles by the presence of the inert liquid maintains the polymer particles in finely divided form during deagglomeration. When a silicone compound such as hexamethyldisilazane is used in conjunction with the silicon dioxide, it is believed that it reacts with hydroxyl groups unavoidably contained in the silicon dioxide and the polymer particles such that the silicon atoms of the silicone compound chemically unite with the oxygen of the hydroxy groups and the nitrogen of the silicone compound unites with the liberated hydrogen from the hydroxyl groups to form ammonia. When the polar hydroxyl groups are rendered non-polar by chemical conversion the particles are not as easily attracted to one another. The chemically attached silicone compound thus aids in breaking up the agglomerates of polymer particles and also aids in maintaining them in a finely divided state.

The silicon dioxide particles used in the practice of this invention can be obtained commercially or it can be prepared by reacting gaseous silicon tetrachloride with steam. The finely divided silicon dioxide particles have an average size of less than about 10 microns. These particles are sometimes referred to as colloidal silicon dioxide. The silicone compounds used in the practice of this invention and represented by the general formula above can be obtained commercially or they can be prepared by silicone chemistry techniques.

The liquid is employed in the deagglomeration zone in an amount sufficient to serve as a medium for covering substantially all of the polymer powder particles and the silicon-containing compounds. As previously indicated, the liquid is substantially inert to the silicon-containing compounds and is characterized by being incapable of acting as a solvent for the polymer powder. Liquids which can be used for this purpose include cyclic and acyclic hydrocarbons having between 5 and 12 carbon atoms per molecule, chlorinated hydrocarbons having a boiling point between about 0° and about 200° C., fluorinated hydrocarbons having a boiling point between about 0° and about 200° C., acyclic ketones having a boiling point between about 0° and about 200° C., petroleum fractions having a boiling point between about 60° and about 200° C., and alkyl ethers having a boiling point between about 0° and about 200° C. Specific exemplary liquids which can be employed include cyclopentane, cyclohexane, cyclooctane, pentane, heptane, octane, 3-methyl hexane, decane, dodecane, decahydronapthalene, benzene, tetrachloroethylene, methylchloroform, hexafluorobenzene, acetone, methyl acetone, methyl ethyl ketone, dioxane, and diethylether.

In another embodiment of the invention, the deagglomeration zone can contain a multitude of grinding stones in the form of spheres or polished stones or the like to assist in breaking up the agglomerates when motion is imparted to the deagglomeration zone. The use of grinding stones is optional because results have shown that deagglomeration can be effected without using them. In this regard, it is important to note that the invenion is not related to conventional grinding techniques wherein the polymer particles are reduced in size by the grinding action of a ball mill or the like.

While substantially all polymer powders containing agglomerates or clusters of the individual particles can be treated in the practice of this invention, specific exemplary polymer powders include polyethylene, polypropylene, copolymers of ethylene and propylene, epoxy polymers, vinyl polymers, poly(vinyl chloride), chlorinated polyethylene, polystyrene, and the like. Although the invention can be successfully employed in the deagglomeration of polymer particles wherein the individual particles are of a size up to about 500 microns or more, it is generally most benesuccessfully employed in the deagglomeration of polymer powder wherein the individual particles are of a size less than about 100 microns and larger than about 0.1 micron.

The resulting polymer particles can be recovered from the deagglomeration zone after treatment by any suitable and convenient technique. For example, the particles can be separated from the liquid which has been charged to the deagglomeration zone by withdrawing the liquid and subsequently transferring the particles to a hot air drying oven to remove residual traces of the liquid. The drying oven can be operated under partial vacuum if desired.

The following examples illustrate procedures and techniques which can be employed in practicing the invention. It is to be understood that these examples are for the purpose of illustration only and should not be construed as limiting of the invention.

EXAMPLE I

A deagglomeration vessel in the form of a size 0 ball mill was charged with 525 milliliters cyclohexane, 8 grams finely divided silicon dioxide marketed under the trade name Cab-O-Sil, and 2 grams hexamethyldisilazane. The vessel was then capped and rotated about a horizontal axis at a speed of about 105 revolutions per minute for about ½ hour. At the end of this period, 200 grams of polyethylene powder comprising particles having an average size of about 100 microns was added to the vessel. Deagglomeration of the polymer powder was effected by rotating the vessel at a speed of about 105 revolutions per minute for about 20 hours. At the end of this period, the ingredients in the vessel were poured through a 3 mesh sieve/funnel arrangement and into a 2 liter round bottom flask. The flask was then attached to a rotating vacuum evaporator and rotated for about 3 hours in a hot water bath maintained at a temperature of between about 50 and about 65° C. After recovery from the round bottom flask, the dried powder weighed about 203 grams.

The density of the polymer powder was measured before and after the deagglomeration treatment by pouring the powder through a paint pigment volume meter in the form of a four plate baffle tower having an attached funnel and a one cubic inch receptacle. The receptacle containing the polymer powder was weighed on an analytical balance to obtain an apparent density of the polymer powder. From these measurements, the apparent density of the polymer powder after the deagglomeration treatment was about 3.1 times greater than the apparent density of the powder before treatment.

The fluidity of the polymer powder was determined before and after the deagglomeration treatment by placing 50 grams of the powder in a 250 milliliter round bottom flask. This flask was connected to another 250 milliliter round bottom flask with a connector tube having a one inch long section with an inside diameter of ½ inch. The flasks were rotated through a 180 degree arc to allow the powder to gravitate through the connector tube and the rate of flow was measured for each polymer sample. The fluidity of the polymer powder after deagglomeration was found to be 14 times greater than the fluidity of the untreated polymer powder.

The surface area of the polymer powder was determined before and after the deagglomeration treatment by gas adsorption according to the so-called Brunauer-Emmett-Teller technique as described in The Journal of American Chemical Society, vol. 60, p. 309 (1938). This techique determines the quantity of gas necessary to form a monolayer on the surfaces of the polymer particles. The surface area of the polymer powder after the deagglomeration treatment was found to be 14 times greater than the surface area before treatment.

The rheology of the polymer powder was determined before and after the deagglomeration treatment by shaking the powder in a sample jar to determine the liquid-like tendencies of the powders which were evaluated independently by three laboratory scientists. A numerical rating of 1 was used to indicate a powder having good liquid-like tendencies and a rating of 7 was used to indicate poor liquid-like tendencies. The rheology rating of the powder by the three scientists before treatment averaged 7 and the rating after the deagglomeration treatment averaged 1.

EXAMPLE II

The technique described in Example I was repeated except that the deagglomeration vessel contained 1290 grams porcelain balls in the for of spheres each having a diameter of about ½ inch and 300 grams grinding stones. The dried polymer powder recovered weighed about 165 grams. The density, fluidity, surface area, and rheology was determined before and after the deagglomeration treatment by the technique described in Example I.

The apparent density of the polymer powder after the deagglomeration treatment was about 2.8 times greater than the apparent density of the powder before treatment.

The fluidity of the polymer powder after deagglomeration was about 14.5 times greater than the fluidity of the polymer powder before treatment.

The surface area of the polymer powder after deagglomeration was about 10.5 times greater than the surface area of the powder before treatment.

The rheology rating of the polymer powder by the three scientists before treatment averaged about 7 and the rating after the deagglomeration treatment averaged about 2.

EXAMPLE III

The technique described in Example I was repeated except the deagglomeration vessel was charged with about 1,015 grams porcelain balls and 300 grams grinding stones. The hexamethyldisilazane described in Example I was not used in this run. After the deagglomeration treatment, the recovered polymer powder weighed about 184 grams. The density, fluidity, surface area, and rheology of the polymer powder was determined before and after the deagglomeration treatment by the techniques outlined in Example I.

The apparent density of the polymer powder after the deagglomeration treatment was about 2.9 times greater than the apparent density of the powder before treatment.

The fluidity of the polymer powder after deagglomeration was found to be about 13.1 times greater than the fluidity of the untreated polymer powder.

The surface area of the polymer powder after deagglomeration was found to be about 9.5 times greater than the surface area of the powder before treatment.

The rheology rating of the polymer powder by the three scientists before treatment averaged about 7 and after deagglomeration the rheology rating averaged about 3.

In a control run to illustrate how the silicon-containing compound contributes to the deagglomeration treatment, the technique described in Examples I through III was repeated in an attempt to deagglomerate the same type of polyethylene powder. The deagglomeration vessel contained 1300 grams porcelain balls, 270 grams polished grinding stones, 525 milliliters cyclohexane, and 200 grams polyethylene powder. The polymer powder recovered weighed 155.7 grams. The polymer powder was tested before and after the control run to determine its apparent density, fluidity, surface area, and rheology.

The apparent density of the polymer powder obtained from the control run was only about 1.3 times greater than the apparent density of the polymer before the run. The fluidity of the polymer powder obtained from the control run was only about 2.4 times greater than the fluidity of the powder before the run. The surface area of the polymer powder after the control run was only about 1.4 times greater than the surface area of the powder before the run. The rheology rating of the powder by the three scientists before treatment averaged 7 and the rating of the polymer after the control run averaged about 5.2 thereby indicating the liquid-like tendencies of the powder was only slightly increased.

Although the invention has been described in consdierable detail, it is to be understood that such description is for the purpose of illustration only and should not be construed as limiting of the invention.

What is claimed is:

1. A method of breaking up agglomerates of polymer particles in a polymer powder to increase the density, the surface area, and the fluidity of the polymer powder, said method comprising:
   charging said polymer powder to a deagglomeration zone;
   charging to said deagglomeration zone between about 0.001 and about 5 weight percent silicon dioxide based upon the weight of said polymer powder charged to said deagglomeration zone, said silicon dioxide being in particle form having an average size of less than about 10 microns;
   charging said deagglomeration zone with between about 0.001 and about 5 weight percent, based upon the weight of said polymer powder charged to said deagglomeration zone, silicone compound selected from the group represented by the formulas (I)                 (R)$_3$SiNHSi(R)$_3$ wherein each R can be the same or different and is selected from the group consisting of ethyl and methyl;

(II) 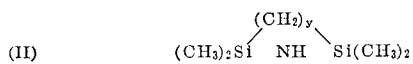

wherein $y$ is an integer between 1 and 5, inclusive; and (III) $\quad CH_3OSi(CH_3)_3$ charging said deagglomeration zone with a liquid in an amount sufficient to serve as a medium for covering substantially all of said polymer powder said silicon dioxide, and said silicone compound in said deagglomeration zone, said liquid being substantially inert to said silicon dioxide and said silicone compound and being incapable of acting as a solvent for said polymer powder, said liquid being selected from the group consisting of cyclic and acyclic hydrocarbons having between 5 and 12 carbon atoms per molecule, chlorinated hydrocarbons having a boiling point between about 0° and about 200° C., fluorinated hydrocarbons having a boiling point between about 0° and about 200° C., acyclic ketones having a boiling point between about 0° and about 200° C. petroleum fractions having a boiling point between about 60° and about 200° C., and alkyl ethers having a boiling point between about 0° and about 200° C.;

imparting motion to said deagglomeration zone to break up said agglomerates of polymer particles; and recovering the resulting polymer particles.

2. A method according to claim 1 wherein said motion is imparted to said deagglomeration zone by rotation about a horizontal axis.

3. A method according to claim 1 wherein said motion is imparted to said deagglomeration zone by stirring.

4. A method according to claim 1 wherein the resulting polymer particles are recovered by separating the particles from the liquid charged to said deagglomeration zone and drying the polymer particles to remove residual traces of liquid.

5. A method according to claim 1 wherein said deagglomeration zone contains a multitude of grinding stones to assist in breaking up said agglomerates when said motion is imparted to said deagglomeration zone.

6. A method according to claim 1 wherein said polymer powder is selected from the group consisting of polyethylene, polypropylene, copolymers of ethylene and propylene, epoxy polymers, vinyl polymers, poly(vinyl chloride), chlorinated polyethylene, and polystyrene.

7. A method according to claim 1 wherein said silicone compound is hexamethyldisilazane.

8. A method according to claim 1 wherein said polymer powder is polyethylene having an average particle size of less than about 100 microns, said liquid is cyclohexane, and said motion is imparted to said deagglomeration zone by rotation about a horizontal axis.

References Cited

UNITED STATES PATENTS

| | | | |
|---|---|---|---|
| 2,870,113 | 1/1959 | Jones | 260—34.2 |
| 3,322,739 | 5/1967 | Hagenmeyer et al. | 260—88.2 |
| 3,422,049 | 1/1969 | McClain | 260—94.9 X |
| 3,432,483 | 3/1969 | Peoples et al. | 260—94.9 X |

JOSEPH L. SCHOFER, Primary Examiner

W. F. HAMROCK, Assistant Examiner

U.S. Cl. X.R.

260—88.25, 91.5, 92.8 A, 93.5 A, 93.1, 93.7